UNITED STATES PATENT OFFICE.

CARL HERMANN HAUSAMANN, OF HAMBURG, GERMANY, ASSIGNOR TO THE FIRM OF DE NORDISKE FABRIKER DE-NO-FA AKTIESELSKAP, OF CHRISTIANIA, NORWAY.

PROCESS FOR CONVERTING UNSATURATED OLEIC AND FATTY ACIDS AND THEIR ESTERS INTO SATURATED COMPOUNDS.

1,145,480.   Specification of Letters Patent.   Patented July 6, 1915.

No Drawing.   Application filed October 7, 1913.   Serial No. 793,888.

*To all whom it may concern:*

Be it known that I, CARL HERMANN HAUSAMANN, a citizen of Switzerland, and resident of Hamburg, in the German Empire, have invented a certain new and useful Process for Converting Unsaturated Oleic and Fatty Acids and Their Esters into Saturated Compounds, of which the following is a specification.

It has been previously proposed to convert unsaturated fatty compounds, such as liquid oils or soft fats and unsaturated fatty acids or their esters into saturated compounds, as solid fats or saturated fatty acids or their esters, such processes being carried out by means of hydrogen in the presence of finely divided metals or metallic compounds acting as catalytic substances. For this purpose various metals in metallic condition have been proposed, as well as inorganic and organic salts or compounds of such metals, from which the metal separates during the hardening operation and acts as a catalytic metal, for example oxids, hydroxids, nitrates, formates and lactates; insoluble soaps of the heavy or noble metals have also been proposed. All such catalysts heretofore used are insoluble in the fats or oils under treatment, and the intimate mixture possible with a soluble substance cannot be obtained.

According to my invention the hydrogen conveying agent added to the unsaturated substances consists of a basic compound of a suitable metal (for example, copper, nickel, cobalt, and other non-noble metals known as catalytic agents, for hydrogenating fats or oils) with a fatty acid soluble in the fatty compound to be treated, such for example as oleic, stearic, or like acid. Such basic metallic compounds may be formed from the substances to be treated, or from compounds similar thereto and dissolve in the melted fats or oils, and, on passing hydrogen through the mixture (at a temperature of say between 100° and 180° C.) a colloidal metallic hydrid is formed that is regarded as the active agent in the reducing or hydrogenating action, which proceeds steadily. The hydrid exists in the mixture as long as there is free hydrogen present, and small additions only of such a fatty compound are sufficient to reduce large quantities of the unsaturated materials. The same fatty acids as exist (usually as glycerids) in the compounds to be treated are preferably employed to form the basic metallic compound used for catalysis. The change of the said basic metallic compounds into an active condition, when dissolved in the fatty material, takes place gradually in the hydrogen atmosphere at temperatures above 100° C. but a higher temperature of, say, about 160° C. would be employed in practice. At this temperature the copper or other hydrid is obtained in colloidal condition.

As an example of the process the following may be taken:—500 parts by weight of raw soy-bean oil is mixed with 0.4 per cent. of the basic oleate of nickel

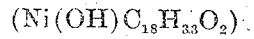

and the mixture is exposed at about 160° C. to the action of hydrogen by any of the well known methods until the desired degree of hardening is attained.

In using a basic oleate of copper (say,

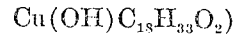

dissolved in the fat and uniformly distributed throughout the whole mass, the compound is acted upon by hydrogen with the formation of water and the mass becomes dark brown. At this stage the freed hydroxyl group probably plays a part in the formation of a copper hydrid. By alternate formation and decomposition of this colloidal copper hydrid the hydrogen is rendered active, converting the unsaturated fatty compounds into saturated, for instance the oleic acid into stearic acid. Analogous reactions occur with the various metallic compounds which may be employed in accordance with this invention. In no case is the metal itself produced or its oxid, as in some of the prior processes, except the end of the reaction, when free hydrogen is eliminated to gradually decompose the hydrid.

The reactions which occur may be given approximately by the following equations, taking copper as the metal and oleic acid as a typical fatty acid of high molecular weight:—

Formation of the primary catalyst

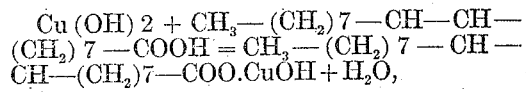

that is, basic copper oleate.

The reaction of this oleate with hydrogen

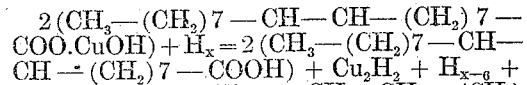

$7(COOH) + 2H_2O + H_{x-6}$.

The resulting final reaction

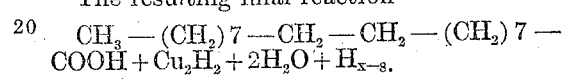

The fatty compound is now a saturated one.

The basicity necessary for the metallic salt is not necessarily represented by the formula given above, as, for example, either one or two molecules of copper hydroxid may react with a molecule of the fatty acid, and even more highly basic compounds are possible without the existence of free hydroxid. Mixtures of normal basic and polybasic salts are serviceable for the present purpose.

The new process offers many advantages over the hitherto known processes. The product of the reaction is not polluted by foreign substances, for example porous bodies, inorganic acids or volatile organic acids, as may be the case, for instance, if nickel formate or lactate is used. The catalytically acting compounds of the non-noble heavy metals (copper, nickel, iron, etc.) produce only fatty acids of high molecular weight as by-products, which acids may be those actually composing the material under treatment, so that, when the reaction is completed the resulting material contains no foreign acid or esters.

The formation of the metallic hydrid in the material under treatment is a characteristic of this process which distinguishes from prior methods of hydrogenation employing metallic organic compounds, where the metal itself is produced in a finely divided condition.

The elimination of the metallic compounds from the hydrogenated fats or oils may be effected by simply washing the latter with dilute acid, for example, hydrochloric acid.

To carry out the process simple apparatus of known construction may be employed.

In the present process the hydrogenation occurs at temperatures between 100° and 180° C., while if metallic oxides or metallic salts of the lower fatty acids are used, higher temperatures are required.

I claim—

1. The process of converting unsaturated fatty acids and their esters into saturated compounds, which comprises acting upon an unsaturated fatty compound in the presence of hydrogen with a basic metallic salt of the fatty compound treated.

2. The process of converting unsaturated fatty acids and their esters into saturated compounds, which comprises acting upon an unsaturated fatty compound at a temperature above 100° C. in the presence of hydrogen with a basic heavy metallic salt of the fatty compound treated.

3. The process of converting unsaturated fatty acids and their esters into saturated compounds, which comprises acting upon an unsaturated fatty compound in the presence of hydrogen with a basic metallic salt of the fatty compound treated, and after the completion of the conversion converting the hydrid to metal in a form insoluble and stable in the resultant product, and separating the metal.

4. A process for converting unsaturated fatty acids and their esters into saturated compounds, which comprises acting upon an unsaturated fatty compound in the presence of hydrogen with a basic metallic salt of a compound similar to that treated.

5. The process of converting unsaturated fatty acids and their esters into saturated compounds, which comprises acting upon an unsaturated fatty compound in the presence of hydrogen with a mixture of a basic and normal metallic salt of the fatty compound treated.

6. The process of hardening oils, which comprises treating the oil with a mixture of basic and normal salts of a compound similar to that treated and soluble therein.

CARL HERMANN HAUSAMANN.

Witnesses:
F. A. MAX KAEMPFF,
EDUARD HOPF.